US Patent

[19] Behrens

[11] Patent Number: 4,646,091
[45] Date of Patent: Feb. 24, 1987

[54] AIRBORNE SET FOR A TWO-WAY DISTANCE-RANGING SYSTEM

[75] Inventor: Hermann-Josef Behrens, Leonberg, Fed. Rep. of Germany

[73] Assignee: International Standard Electric Corporation, New York, N.Y.

[21] Appl. No.: 664,667

[22] Filed: Oct. 25, 1984

[30] Foreign Application Priority Data

Oct. 29, 1983 [DE] Fed. Rep. of Germany ....... 3339388

[51] Int. Cl.$^4$ ........................................... G01S 13/76
[52] U.S. Cl. ..................................................... 342/47
[58] Field of Search ............... 343/6.5 R, 6.5 LC, 7.3

[56] References Cited
U.S. PATENT DOCUMENTS
3,940,764  2/1976  Beeswing ..................... 343/6.5 LC Primary Examiner—T. H. Tubbesing
Assistant Examiner—Gilberto Barrón, Jr.
Attorney, Agent, or Firm—John T. O'Halloran; Thomas F. Meagher

[57] ABSTRACT

In the standard DME system, an airborne station having transmitted a pair of interrogation pulses receives a plurality of pairs of space-coded reply pulses from which the pulse pairs intended for the airborne station are selected by a decoder (DK) and a correlator (KR).

The invention uses the first pulse of the selected pulse pair for the distance measurement. A measuring counter (MZ) is provided whose count is transferred to a register file (SR) at the reception of every pulse. A reply signal intended for the airborne station stops the write operation, it being insured that the counts based on the two pulses of the reply signal intended for the airborne station are contained in the register file (SR). Starting from the last count based on the second pulse, an evaluating circuit calculates back to the first pulse, taking account of the decoded pulse spacing.

3 Claims, 1 Drawing Figure

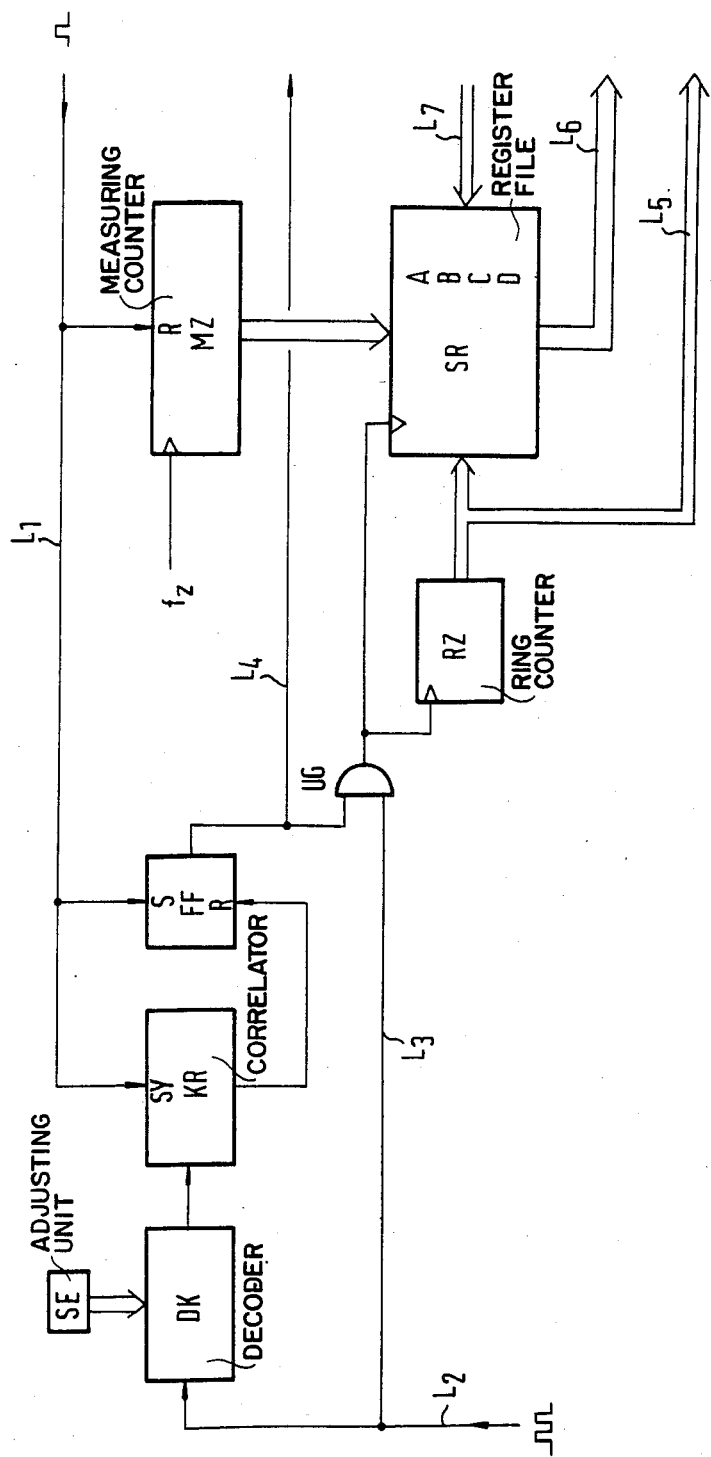

AIRBORNE SET FOR A TWO-WAY DISTANCE-RANGING SYSTEM

The present invention relates to an airborne set for a two-way distance-ranging system as set forth in the preamble of claim 1.

An airborne set of this kind is described in a book by E. Kramar, "Funsysteme für Ortung und Navigation", Verlag Berliner Union GmbH, Stuttgart, 1973, pp. 148 to 155. The essential functions of such an airborne set are to separate the replies intended for it from the other signals transmitted by the fixed transponder, to determine the round-trip time of transmission, and to convert the measured time into a distance indication.

To ensure high measurement accuracy, it is very important that the time of reception of the reply signals be accurately measured. This is ensured to a large extent if the first pulse of each received pair of reply pulses is evaluated, because reflection errors can be reduced considerably in this manner. Known circuits with which this is implemented are relatively costly and complicated.

The object of the invention is to provide an airborne set of the above kind which is reliable despite having a circuit of simple design.

This object is attained by the features set forth in claim 1. The subclaims show advantageous developments of the subject matter of the invention.

The principal advantages of the invention are that the components count is reduced, that the computer system of the set is lightly loaded, and that fast processing of the reply signals and precise measurements are ensured.

An embodiment of the invention will now be explained in more detail with reference to the accompanying drawing.

The block diagram of the drawing shows that portion of an airborne set in which the reply signals are evaluated.

A line $l_2$ coming from the receive circuit is connected to the input of a decoder DK, which decodes the pairs of reply pulses in the known manner. The decoder is adjustable to different pulse-pair spacings via an adjusting unit SE. Its output is connected to the input of a correlator KR. The output of the correlator KR is coupled to the reset input of a flip-flop FF, which has its output connected to one input of an AND gate UG. The second input of the AND gate UG is connected directly to the line $l_2$ by a line $l_3$. The output of the AND gate UG is coupled to the input of a ring counter RZ and to a write enable input of a register file SR. The register file SR preferably has four locations A to D, which are cyclically addressed by the ring counter RZ for the transfer of counts from a measuring counter MZ.

The measuring counter may be constructed in accordance with German Patent Application P 32 40 891.9. The measuring counter disclosed there serves to measure the time intervals between an event A and two or more events B. It consists of a main counter and an auxiliary counter which are both asynchronous counters. When the measuring counter is started, the main counter begins to count at a count frequency. A signal indicating the A-event resets the main counter to zero. A subsequent first signal indicating a B-event stops the main counter and starts the auxiliary counter, which is a ring counter. The capacity of the auxiliary counter is chosen so that the main counter has sufficient time to set its stages, and that the count corresponding to the time interval can be transferred into a register. Via the auxiliary counter, the count of the main counter is corrected by a value corresponding to the stop period of the main counter, so that the latter will continue from a count as if it had counted continuously. If a second or further signals indicating a B-event appear, the sequence just described is repeated.

The measuring counter of the present invention, too, is incremented at a count frequencey $fz$. Its reset input R, the set input of the flip-flop FF, and a sync input SY of the correlator KR are connected to a common line $l_1$. The output of the flip-flop FF is connected to an associated computer (not shown) by a line $l_4$. The address output of the ring counter RZ and the output of the register file SR are connected to the computer by buses $l_5$ and $l_6$, respectively. Via a bus $l_7$, the computer has access to the locations A to D of the register file SR if these locations are suitably addressed.

The operation of the above arrangement is as follows. To interrogate a transponder, the airborne set is first adjusted to the operating mode of the transponder, i.e., to the transponder frequency and the transponder-specific spacing of the pulse pairs. This pulse spacing is entered into the decoder DK via the adjusting unit SE.

Simultaneously with the transmission of an interrogation signal in the form of a pulse pair, a start pulse synchronized with the first pulse occurs on the line $l_1$. It starts the correlator KR, sets the flip-flop FF, and resets the measuring counter MZ, which immediately goes on counting at the count rate $fz$.

As the flip-flop FF is set, the AND gate is enabled via one of its inputs. In the receive mode of the airborne set, all received signals are applied as trigger pulses over the line $l_2$ to the decoder DK and over the line $l_3$ to the second input of the AND gate UG. At the application of each pulse, the AND gate UG is activated, and the ring counter RZ is incremented by one count. Thus, the locations A, B, C, and D in the register file SR are addressed in a cyclic sequence. By the simultaneous application of a pulse to the write enable input of the register file SR, the respective count of the measuring counter MZ is transferred into one of these locations.

While the AND gate UG is activated and initiates a write operation at the application of every pulse, the recognition circuit consisting of the decoder TK and the correlator KR checks the incoming pulse pairs for the pulse spacing and for their synchronism with the interrogation signal. If both conditions are satisfied several times, a threshold value is exceeded in the correlator KR. This causes the flip-flop FF to be restored to the initial state. The AND gate UG is thus inhibited, so that the ring counter RZ and the register file SR remain in their current states. This is communicated to the computer by the change in potential on the line $l_4$.

The decoder DK checks the pulse spacing in the usual manner by delaying the first pulse of each pulse pair by the predetermined nominal spacing and comparing it with the second pulse. If the two pulses are congruent, this is an indication that the pulse pair is one with the spacing searched for. With this test principle, the decoder result is present only at the second pulse. For the aforementioned reasons, however, it is necessary to refer the distance measurement to the first of the two pulses.

With the aid of the arrangement described, the instant of the first pulse can be reproduced, as will be explained in the following.

After the correlator KR has determined replies that are synchronous with the interrogations, the transfer of further counts to the register file SR is interrupted as described above. This occurs each time after the second pulse of a reply signal intended for the interrogator has caused the count to be transferred to one of the locations A to D of the register file SR. The address of the respective location is preserved in the ring counter RZ. Following the signalling of the potential change over the line $l_4$, this address is fetched by the computer over the bus $l_5$. It is fed as a read address over the bus $l_7$ to the register file SR to specify the location which holds the count belonging to the second pulse of the last evaluated reply signal intended for the interrogator. The count is read out over the bus $l_6$ and temporarily stored. By subsequently decrementing the read address, the three previous counts still stored in the register SR can be accessed. These counts must include the count belonging to the first pulse of the last reply signal intended for the interrogator. By a few subtractions and comparisons taking into account the decoded pulse spacing, the count belonging to the first pulse can be quickly and accurately determined. It is taken as a basis for the following distance computation.

The time conditions are chosen so that the contents of the register file SR have been read when the next fetch cycle begins.

A register file SR with four locations is only one possibility. Theoretically, two locations are sufficient to store the counts for the two pulses of a reply signal. For reasons of safety, however, it is advisable to provide more than two locations, because the possibility of extraneous pulses being received between the pulses of a reply signal cannot be ruled out. In the case of a two-bit register, this would result in the loss of the count for the first pulse, so that no distance measurement would be possible.

I claim:

1. Airborne set for a two-way distance-ranging system which radiates interrogation signals and receives reply signals from a transponder, the interrogation and reply signals consisting of pairs of pulses spaced a predetermined time distance apart, the distance to the transponder being determined from the time difference between the radiation of an interrogation signal and the reception of a reply signal taking account of built-in equipment delays, and the airborne set containing a recognition circuit which consists of a decoder and a correlator and selects the reply signals intended for it from a plurality of pulse pairs transmitted by the transponder, characterized in that a measuring counter (MZ) is provided which counts from zero upon every interrogation, that the measuring counter (MZ) has its output connected to a register file (SR), that means is provided for transferring to said register file (SR) the count associated with the time of receipt of each pulse received after an interrogation, only in response to receipt of each said pulse received after an interrogation, that the recognition circuit (decoder DK, correlator KR) prevents the transfer of any further counts on the occurrence of the second pulse of the reply signal, and that an evaluating circuit is provided which, starting from the last count (based on the second pulse of the reply signal) transferred into the register file (SR), calculates back to the count corresponding to the first pulse, taking account of the predetermined pulse spacing of the reply intended for the airborne set.

2. An airborne set as claimed in claim 1, characterized in that a ring counter (RZ) is provided whose capacity is equal to the number of locations of the register file (SR), that the ring counter (RZ) successively addresses the locations into which the counts of the measuring counter are to be transferred, and that the write address set in the ring counter (RZ) is equal to the read address under which the last count transferred to the register file (SR) can be found in the register file (RS).

3. An airborne set as claimed in claim 1, characterized in that the register file (SR) has at least two locations.

* * * * *